United States Patent
Takayama

(10) Patent No.: US 6,267,700 B1
(45) Date of Patent: Jul. 31, 2001

(54) COOLING SYSTEM FOR A VEHICLE POWER UNIT

(75) Inventor: Satoshi Takayama, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 09/390,538

(22) Filed: Sep. 3, 1999

(30) Foreign Application Priority Data

Oct. 15, 1998 (JP) .................................................. 10-293397

(51) Int. Cl.[7] ............................... F16H 57/04; B62J 13/00
(52) U.S. Cl. ............................ 474/93; 474/150; 474/144
(58) Field of Search ............................... 474/93, 92, 144, 474/145, 146, 150, 8, 13, 14; 74/606 L, 606 A; 180/229, 219, 251, 230

(56) References Cited

U.S. PATENT DOCUMENTS

| 4,531,928 | * | 7/1985 | Ikenoya ................................. 474/93 |
| 4,631,977 | * | 12/1986 | Kawashima ...................... 474/150 X |
| 4,671,782 | | 6/1987 | Ochiai et al. . |
| 4,697,665 | | 10/1987 | Eastman et al. . |
| 4,712,629 | | 12/1987 | Takahashi et al. . |
| 5,976,044 | * | 11/1999 | Kuyama ........................... 474/146 X |

FOREIGN PATENT DOCUMENTS

| 4241804 | * | 6/1994 | (DE) . |
| 14362 | * | 1/1997 | (JP) . |
| 262265 | * | 1/1997 | (JP) . |

* cited by examiner

Primary Examiner—David A. Bucci
Assistant Examiner—Marcus Charles
(74) Attorney, Agent, or Firm—Darby & Darby

(57) ABSTRACT

A cooling system for a vehicle power unit has a cooling fan rotated by the rotational force from the crankshaft, in the housing thereof so as to cool the internal space of the housing by introducing air into the housing and discharging the thus introduced air to the outside through upper and lower outlet ports. The upper side outlet port is formed in the housing upper surface opposing the approximate middle portion of the V-belt's return path along which the V-belt moves from the rear to the front so as to promote the current of air introduced in the housing to flow along the direction of travel of the V-belt.

11 Claims, 10 Drawing Sheets

COOLING SYSTEM FOR A VEHICLE POWER UNIT

BACKGROUND OF THE INVENTION (1) Field of the Invention

The present invention relates to a cooling system for a power unit incorporating a V-belt transmission mounted on a vehicle such as a scooter etc.

(2) Description of the Prior Art

In a typical scooter, the engine and its power transmission for transmitting the engine's driving force to the rear wheel are held by a common housing forming an integrated power unit. As a power transmission for this power unit, a V-belt transmission T as shown in FIG. 1 is known by which the engine force is transmitted from a drive pulley 'b' fixed on a crankshaft 'a' to a drive pulley 'd' fixed on a drive shaft 'c' on the driven side via a V-belt 'e'.

In this power unit P, the engine's crankshaft, together with V-belt transmission T and other components, are accommodated within a common housing 'g' so that heat from the engine is subject to build up with in housing 'g'. To avoid this, a power unit P of this type is provided with a cooling fan 'f' which is rotated by the engine's driving force so as to forcibly create a current of air and cool the air within housing 'g' by the air flow function of cooling fan 'f'.

The above conventional power unit P, however, has suffered a problem in that cooling fan 'f' cannot create an efficient enough current of air within housing 'g' to provide sufficient cooling effects.

More specifically, in the conventional power unit P, the current of air created by the rotation of fan 'f' is conducted to an outlet air path 'g1' formed in the rear portion of housing 'g' as shown by the arrow in FIG. 1 so that the hot air is discharged through an outlet port 'g2' that opens downwards. Therefore, the air conveyed to the rear portion will move in a direction opposite to the movement of V-belt 'e' in the rearmost portion, which will inhibit the flowability of the current of cooling air, resulting in degradation of cooling efficiency.

SUMMARY OF THE INVENTION

The present invention has been devised in view of the above prior art problems and it is therefore an object of the present invention to provide a cooling system for a vehicle power unit which facilitates efficient cooling inside a power unit.

In order to achieve the above object, the present invention is configured as follows:

In accordance with the first aspect of the present invention, a cooling system for a vehicle power unit incorporates: a V-belt transmission in which a drive pulley fixed on the crankshaft of an engine and a driven pulley fixed to the driven shaft linked with the wheel axle are arranged one behind the other and an endless V-belt is wound between the pulleys; and the crankshaft, in a housing thereof and includes: a cooling fan rotated by the rotational force from the crankshaft and disposed in the housing so as to cool the internal space of the housing by introducing air into the housing and discharging the introduced air to the outside through an outlet port; and
an upper side outlet port formed in the housing upper surface opposing the approximate middle portion of the V-belt's return path along which the V-belt moves from the rear to the front, and is characterized in that the current of air created by the cooling fan is flowed along the outgoing path of the V-belt moving from the front to the rear and then the air reaching the end of the outgoing path of the V-belt is flowed along the return path of the V-belt so as to discharge the air through the upper outlet port.

In accordance with the second aspect of the present invention, the cooling system for a vehicle power unit having the above first feature, further, comprises a lower side outlet port that opens downward, formed near the end of the outgoing path of the V-belt, and is characterized in that the current of air created by the cooling fan is flowed along the outgoing path of the V-belt and then part of the air reaching the end of the outgoing path is discharged from the lower side outlet port while the rest is further flowed along the return path of the V-belt and discharged from the upper outlet port.

In accordance with the third aspect of the present invention, the cooling system for a vehicle power unit having the above first feature is characterized in that an outlet air conduit duct for conducting the discharged air from the upper outlet port downward is joined to the upper outlet port.

In accordance with the fourth aspect of the present invention, the cooling system for a vehicle power unit having the above second feature is characterized in that an outlet air conduit duct for conducting the discharged air from the upper outlet port downward is joined to the upper outlet port.

In accordance with the invention described heretofore, the following effects can be attained.

In the present invention configured as above, as the crankshaft is rotationally driven by the engine, the cooling fan rotates. The current of air created by the rotation of the cooling fan flows along the outgoing path of the V-belt moving from the front to the rear, and then reaches the end of the outgoing path. The air further flows along the return path of the V-belt and discharged from the upper side outlet port together with heat generated from the engine, to the external space and thus the power unit is cooled. In this process, since the air flowing inside the housing moves along with the movement of the V-belt, efficient flow and discharge of air can be done markedly smoothly while preventing the air flow from being impeded by the V-belt, thus achieving efficient cooling.

In accordance with the second feature of the present invention, in addition to the upper outlet port, a lower side outlet port that opens downward is formed near the end of the outgoing path of the V-belt. In this arrangment, when the current of air created by the cooling fan is flowed along the outgoing path of the V-belt and reaches the end of the outgoing path, part of the air may be discharged from the lower side outlet port while the rest may be conveyed along the return path of the V-belt and discharged from the upper outlet port. Accordingly, this configuration makes it possible to secure an improved flowability of air inside the housing, thus achieving an excellent cooling efficiency.

When an outlet air duct for conducting the discharged air from the upper outlet port downward is jointed to the upper outlet air port, it is possible to prevent entrance of rainwater, dirt and dust etc. from the upper side outlet port into the housing.

DESCRIPTION OF THE PREFERRED EMBODIMENTS

The embodiment of the present invention will hereinafter be described with reference to FIGS. 2 through 13.

Figure 1:
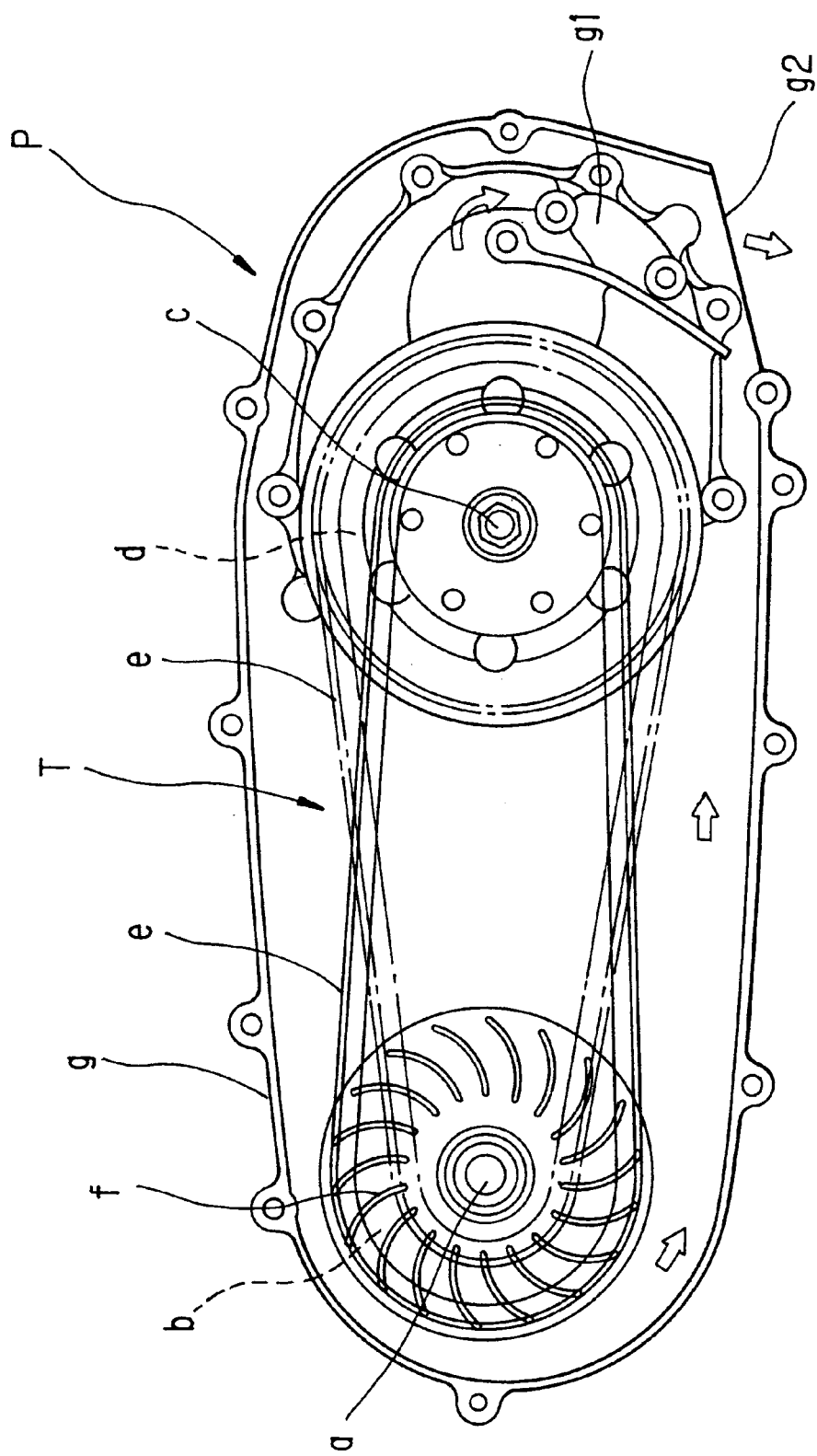
FIG. 1 is an illustrative side view showing a V-belt transmission and other components of a conventional vehicle power unit.
Figure 2:
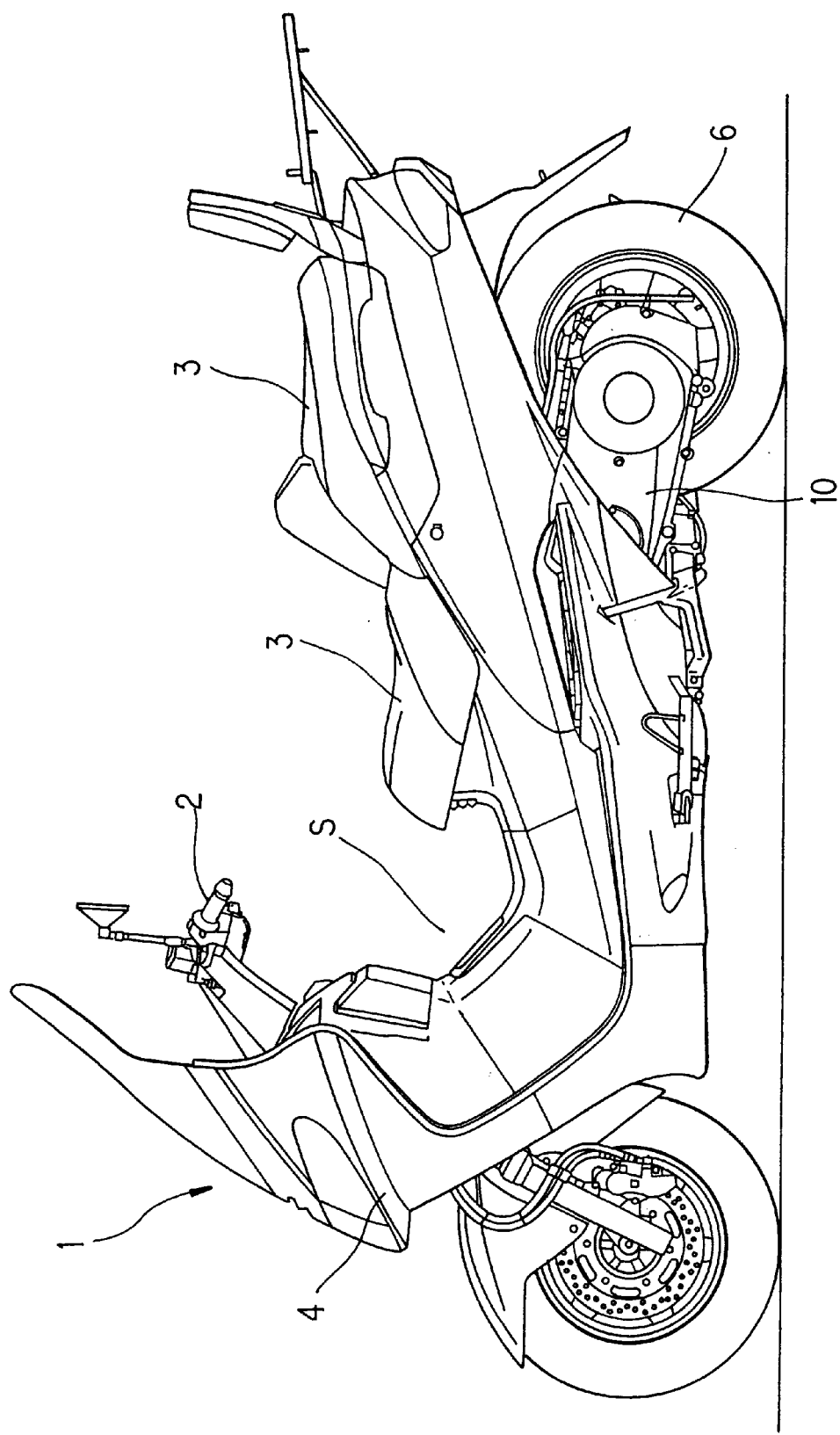
FIG. 2 is a side view showing an overall configuration of a scooter type motorcycle to which an embodiment of the present invention is applied.
Figure 3:
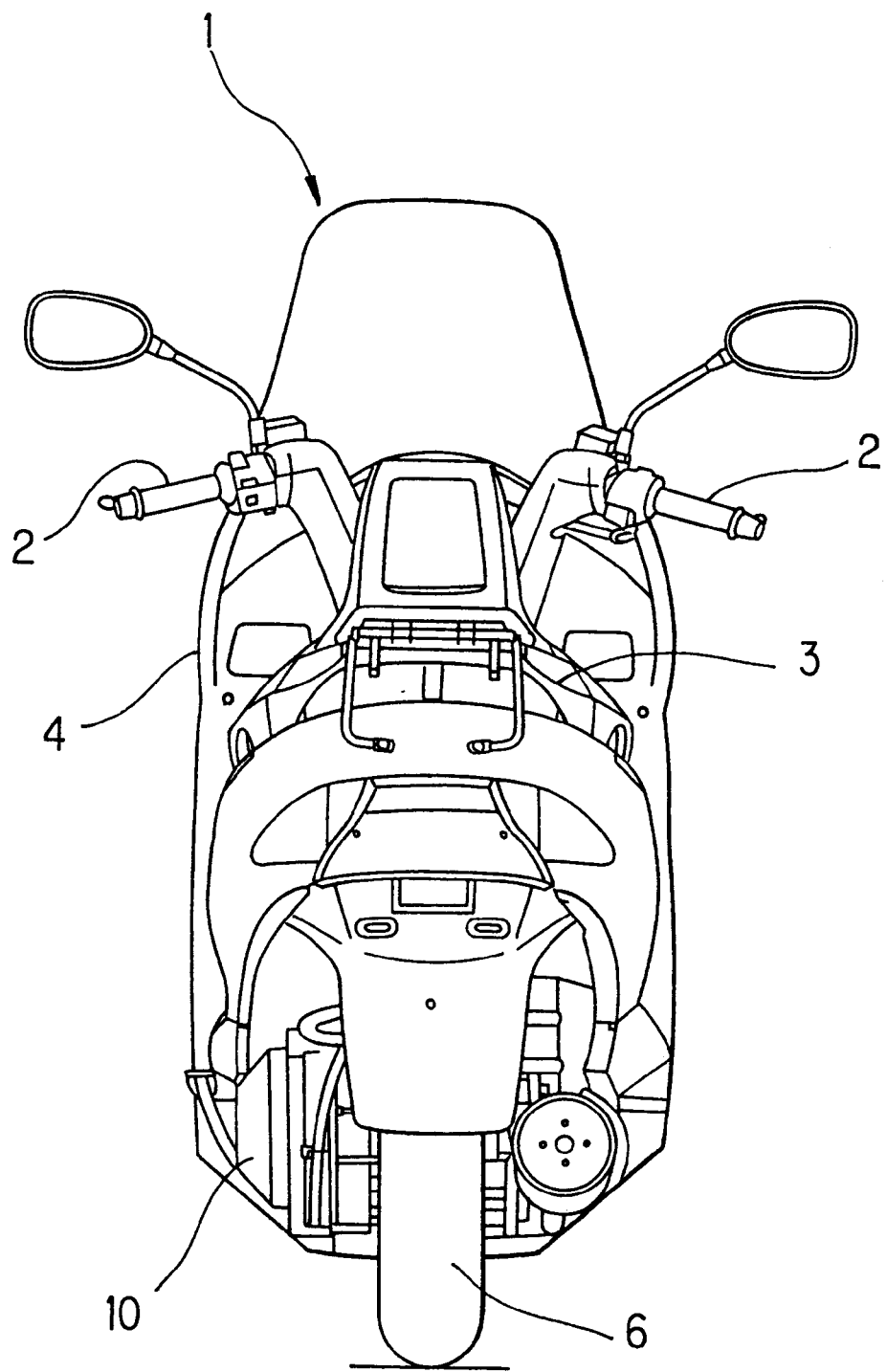
FIG. 3 is a rear view of that shown in FIG. 2.

FIG. 2 is a side view showing an overall configuration of a scooter type motorcycle to which an embodiment of the invention is applied, and FIG. 3 is the rear view. A motor cycle 1 shown here is a so-called scooter type motorcycle that has a U-shaped, step-through space 5 between handlebars 2 and a seat 3 with wide legshields 5 covering the rider's legs arranged on both sides of a front cover 4. This motorcycle further includes a power unit 10 swayably disposed in the vehicle's rear frame, together with the rear wheel.

Figure 4:
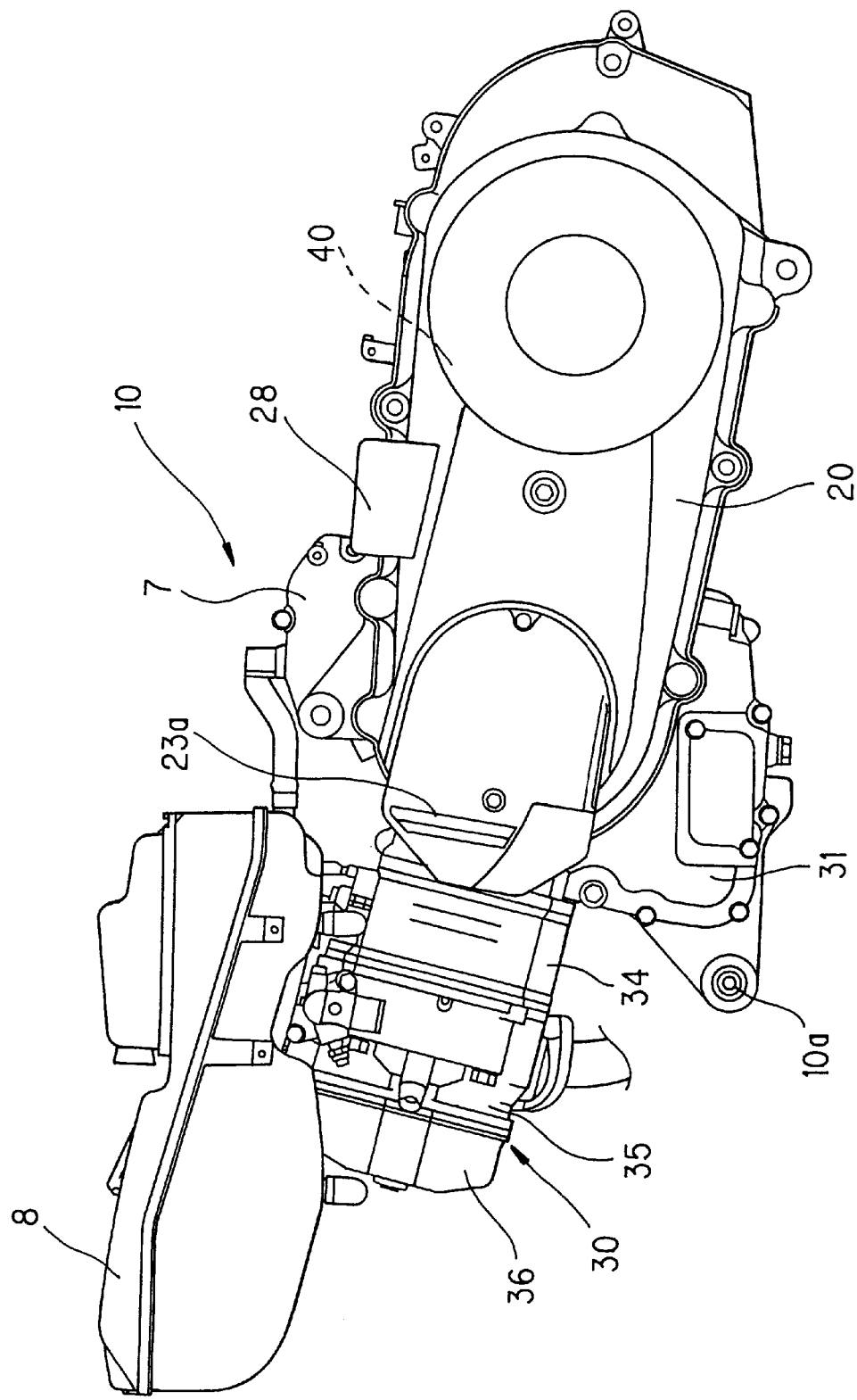
FIG. 4 is a side view showing an overall configuration of the power unit shown in FIG. 2.
Figure 5:
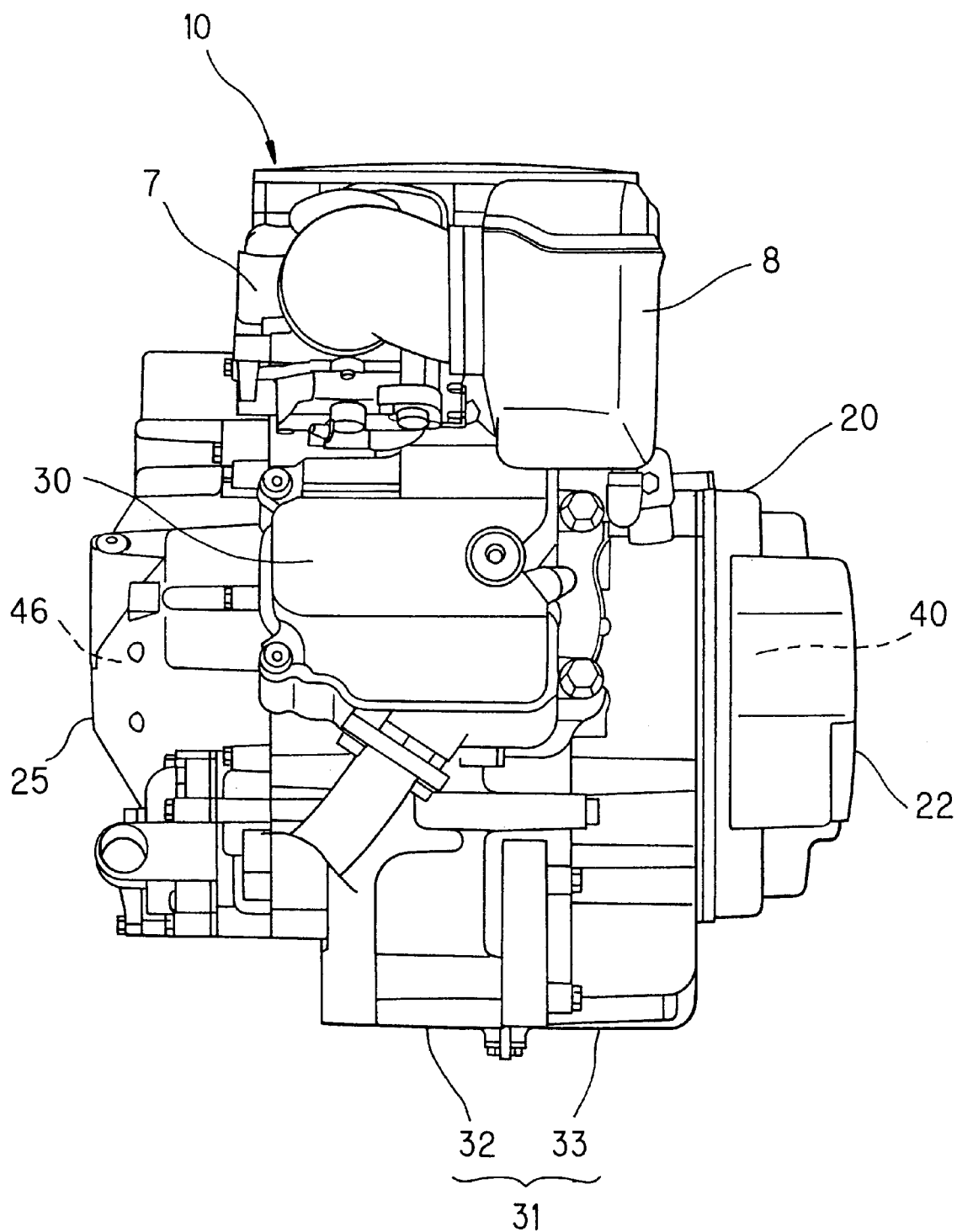
FIG. 5 is a front view of that shown in FIG. 4.
Figure 6:
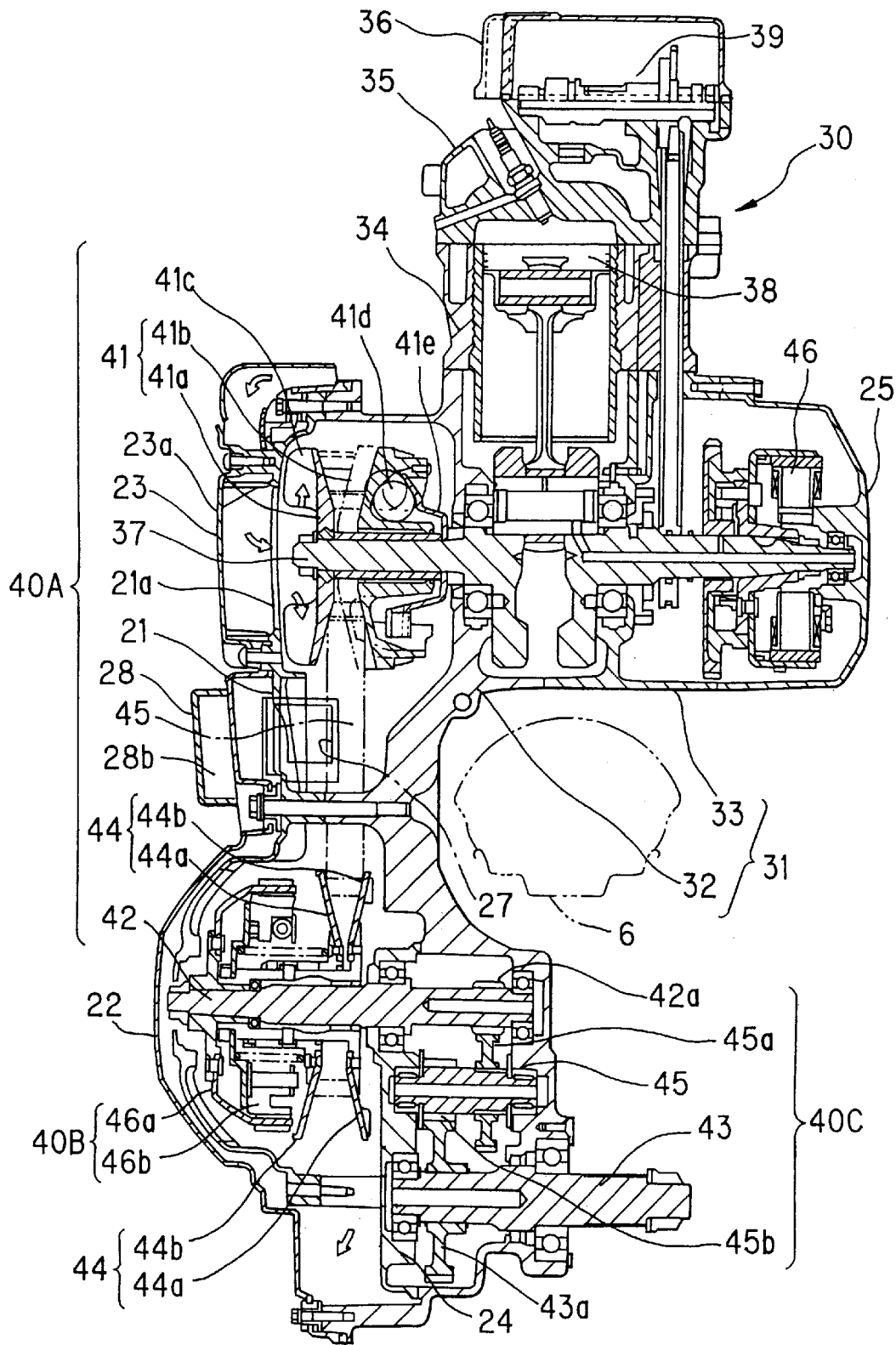
FIG. 6 is a transverse sectional view of that shown in FIG. 4.

FIG. 4 is a side view showing power unit 10, and FIG. 5 is a front view of that shown in FIG. 4. This power unit 10 is swayably supported by the vehicle's rear frame via an unillustrated cushioning unit and a pivot 10a.

Power unit 10 includes a housing 20, an engine 30 held by housing 20, and power transmission 40 for transmitting the drive force of engine 30 to the rear axle shaft (wheel axle) that supports a rear wheel 6. In FIG. 4, 7 designates a carburetor joined to engine 30 of the power unit and 8 designates an air cleaner for supplying air to the carburetor.

Housing 20 comprises: a crankcase 31 composed of a pair of cases, left and right cases 32 and 33; a gear box cover 24 fixed in the rear portion of the left end face of left case 32; an inner cover 21 secured on the left end face of left case 32; an outer cover 22 secured so as to cover the rear half of the left side of inner cover 21; a fan cover 23 secured so as to cover an intake opening 21a of inner cover 21; and a generator cover 25 closing the opening formed at the right side end of right crankcase 33 and covering a generator 46 supported on a crankshaft 37.

Projected forward and upward from crankcase 31 is a cylinder 34 with a cylinder head 35 fixed thereon. A cylinder head cover 36 is fixed at the front end of cylinder head 35. Crankshaft 37 is rotatably supported in crankcase 31. Cylinder 34 incorporates a piston 38 moving back and forth with the rotation of crankshaft 37. A valve operating mechanism 39 is housed in the cylinder head. Thus, a four-cycle engine 30 is configured with components 31 to 39 and others.

Contained in the accommodation space formed by left casing 32 and inner cover 21 is power transmission 40 for transmitting the rotational force of engine 30 to rear axle shaft 43. This power transmission 40 has a speed change device 40A, a clutch mechanism 40B and a gear set 40C.

Speed change device 40A includes: a drive pulley 41 supported on crankshaft 37 projecting leftwards from left 32 and gear box cover 24, in front of rear axle shaft 43; a driven pulley 44 supported by drive shaft 42; and a V-belt 45 wound between drive pulley 41 and driven pulley 44.

Drive pulley 41 is configured of a fixed face 41a fixed on crankshaft 37 and a movable drive face 41b supported by crankshaft 37 so as to be movable In the thrust direction and unmovable in the rotational direction. In this arrangement, a spherical body 41d moves along a guide member 41e by centrifugal force as crankshaft 37 rotates so as to urge movable drive face 41b to move in the thrust direction along crankshaft 37. Fixed drive face 41a has a number of fins on the left side face thereof to also function as a cooling fan 41c.

Driven pulley 44 includes a fixed driven face 44a fixed on drive shaft 42 and a movable driven face 44b which is unable to move relative to fixed driven face 44a and movable in the thrust direction. A spring is provided between clutch mechanism 40B and movable driven face 44b so as to urge movable driven face 44b toward fixed driven face 44a.

Clutch mechanism 40B includes a clutch housing 46a fixed on drive shaft 42 and a clutch shoe 46b fixed to fixed driven face 44a and transmits the rotation of clutch shoe 46b to drive shaft 42 via clutch housing 46a when the rotational speed of clutch shoe 46b exceeds a constant level and comes into contact with clutch housing 46a.

Gear set 40C is configured of a drive gear 42a integrally formed at the right end of drive shaft 42, idle gears 45a and 45b fixed on an idle shaft 45 arranged in parallel to and between drive shaft 42 and rear axle shaft 43 and a driven gear 43a fixed on rear axle shaft 43.

Figure 7:
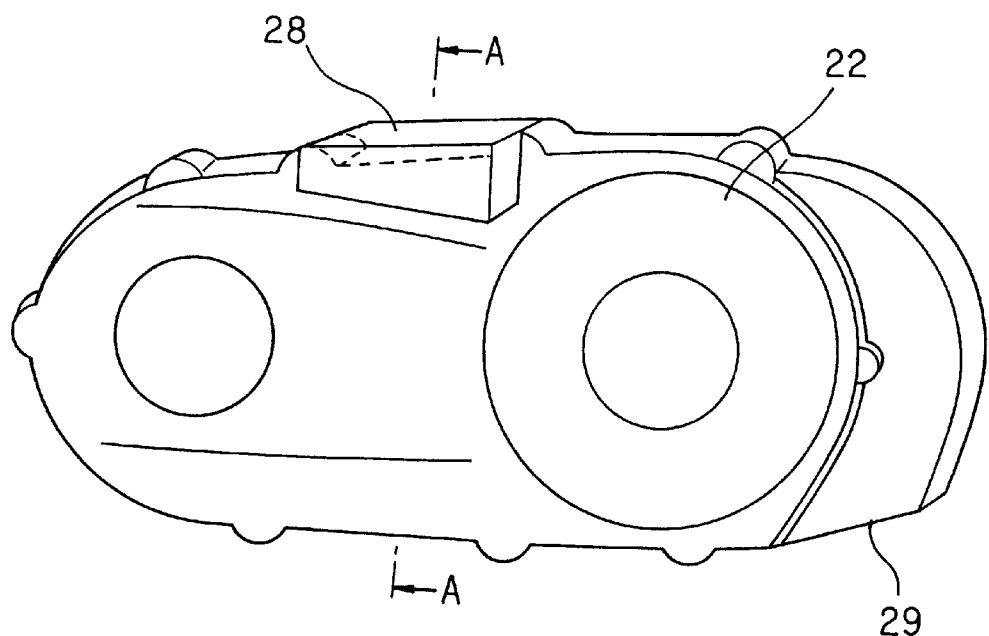
FIG. 7 is a perspective view showing an outer cover of the housing shown in FIG. 6.
Figure 8:
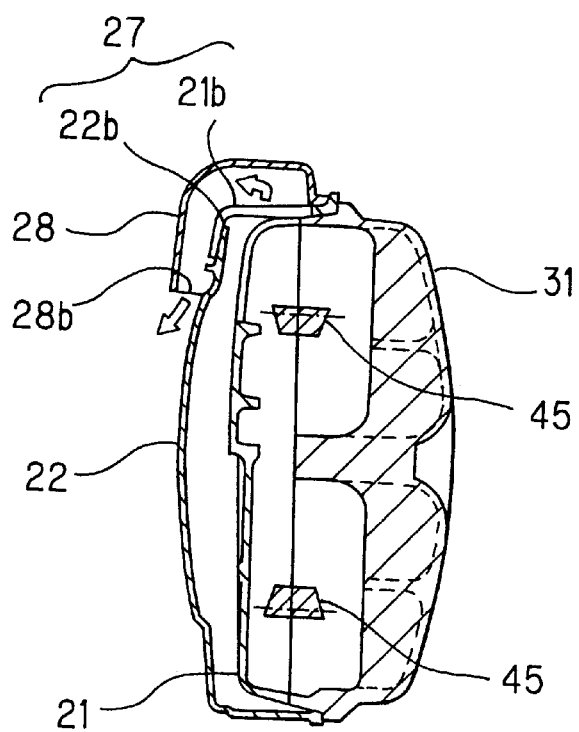
FIG. 8 is a vertical sectional side view cut along a line A—A in FIG. 7.

Housing 20 also has upper and lower outlet ports 27 and 29 for discharging air from the interior thereof to the external space (see FIGS. 7 and 8).

Figure 9:
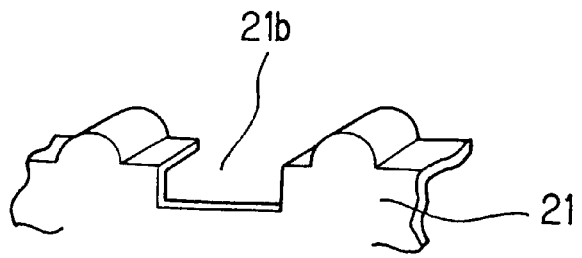
FIG. 9 is an illustrative perspective view showing an outlet port of the inner cover shown in FIG. 8.
Figure 10:
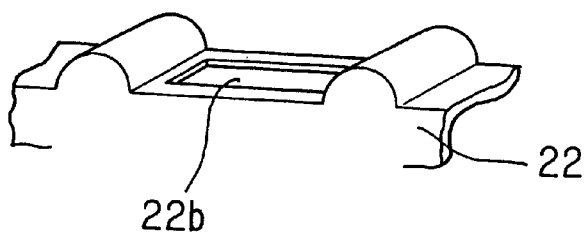
FIG. 10 is an illustrative perspective view showing an outlet port of the outer cover shown in FIG. 9.

In this embodiment, inner cover 21 and outer cover 22 as parts of housing 20, in combination, constitute the upper central portion on the left side of housing 20. Specifically, as shown in FIG. 9, the bent portion extending across the upper and side portions in the central part of inner cover 21 is cut out forming a cutout 21b. Also, outer cover 22 has a rectangular opening 22b on its lower side corresponding to the upper side of inner cover 21 so that the opening will be laid over cutout 21b. By this combination, outlet port 27 is formed which communicates between the internal and external spaces of housing 20. This outlet port 27 faces the upper portion of V-belt 45, that is, the central portion of the return path from the rear to the front.

Figure 11:
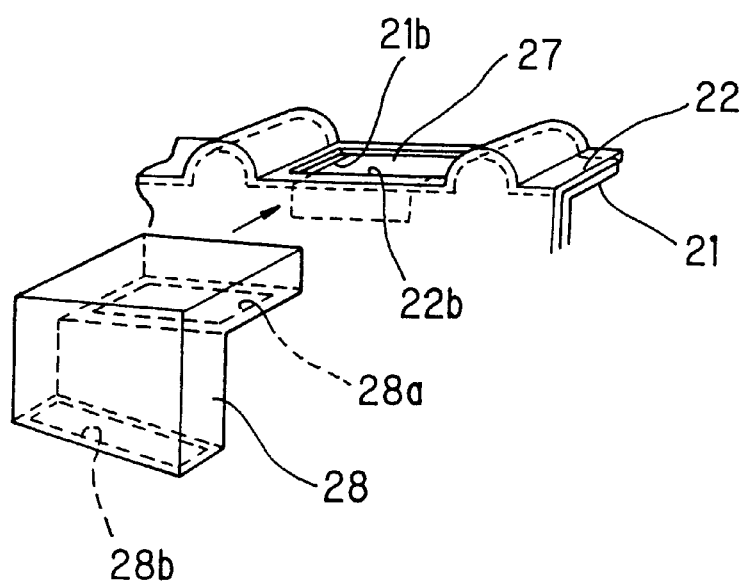
FIG. 11 is an illustrative perspective view showing the assembled state of the components shown in FIGS. 9 and 10.
Figure 12A:
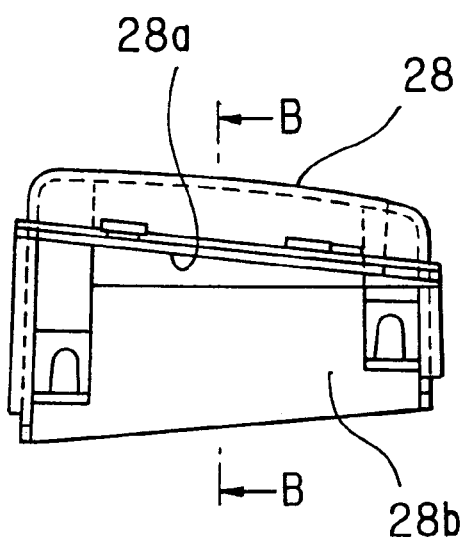
FIGS. 12A to 12C are views showing the shape of the duct shown in FIGS. 7 and 8, FIG. 12A being the right-side view, FIG. 12B being the rear view and FIG. 12C being the left-side view; and, FIG. 13 is an illustrative side view showing the V-belt transmission and other components accommodated in the housing shown in FIG. 6.
Figure 12B:
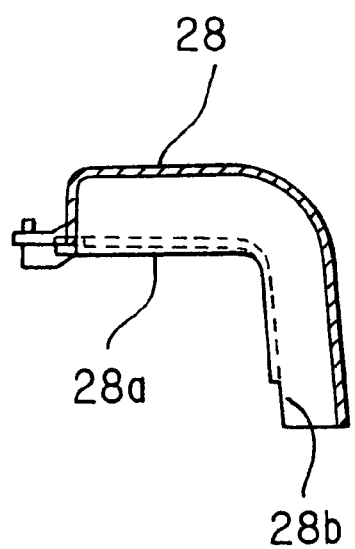
Figure 12C:
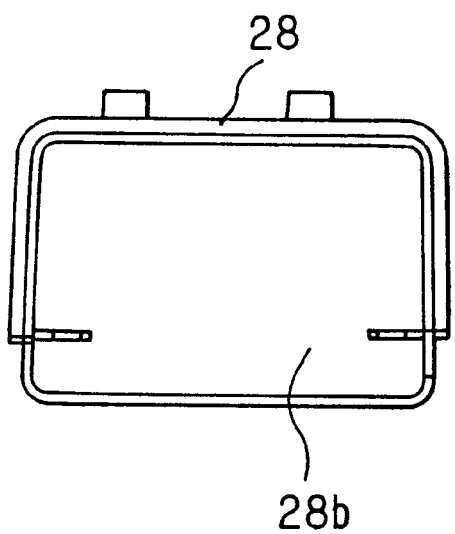
Figure 13:
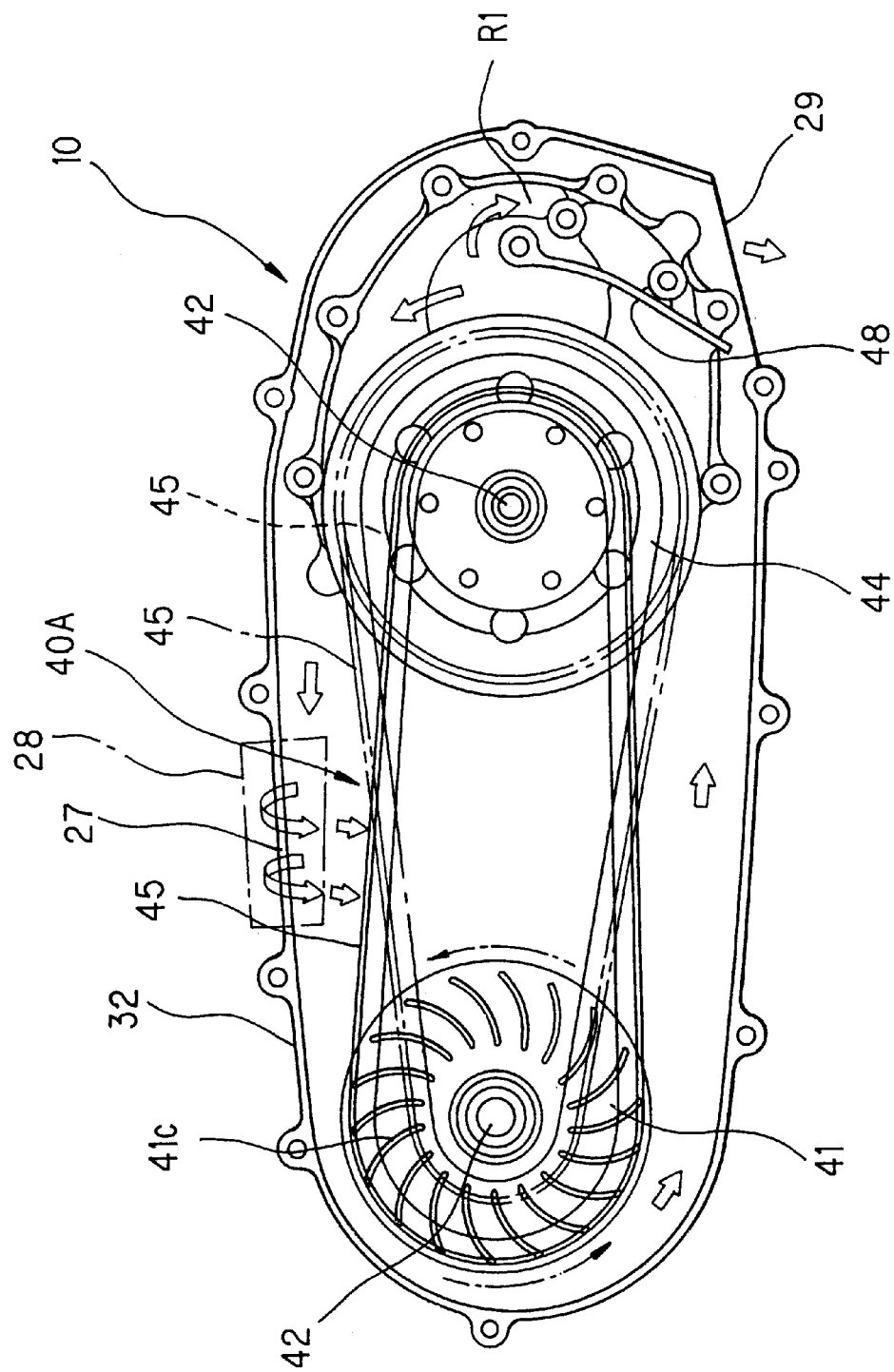

As shown in FIGS. 8, 11 and 12, a duct 28 is joined to upper outlet port 27. This duct 28 has an L-shaped configuration so as to be fixed along the upper and side surfaces of outer cover 22. Formed in the upper portion of duct 28 is an air conducting port 28a connected to upper outlet port 27 while an outlet port 28 for conducting the air to the lower portion and discharging it downward is formed so that air can be discharged toward the ground.

Lower outlet port 29 is formed at the lower end of an air flow path R1 formed in the rear portion of housing 20. This air flow path R1 is defined by a baffle plate 48 extending downward in the rear of driven pulley 44 so that air reaching the rear of driven pulley 44 may be conducted toward lower outlet port 29.

In the thus configured power unit 10, when engine 30 is started, the driving force is transmitted to rear axle shaft 43 by way of power transmission 40. More specifically, when engine 30 is started and hence piston 38 reciprocates, drive pulley 41 starts rotating together with crankshaft 37. This rotation of drive pulley 41 is transmitted to driven pulley 44 located in the rear by way of V-belt 45. When the rotating speed of the driven pulley exceeds a constant level, clutch shoe 46a rotating with the pulley comes into contact with clutch housing 46b. Therefore, the rotational force of driven pulley 44 is transmitted to rear axle shaft 43 and hence rear wheel 6 rotates.

With the driving of engine 30, cooling fan 41c integrally formed with drive pulley 41 suctions external air through an external inlet opening 23a formed in fan cover 23 and conveys air to the rear of housing 20 through intake opening 21a of inner cover 21. Since cooling fan 41c rotates counterclockwise as indicated by the chained arrow shown in the left side view in FIG. 13, the air introduced into housing 20 is conveyed passing through the lower portion of housing 20 to driven pulley 44 located at the rear. The air reaching driven pulley 44 proceeds along baffle plate 48 to the rear of driven pulley 44. The air flow is then branched into two paths, i.e., the first air flow path R1 defined between baffle plate 48 and the external surface of housing 20 and the second air flow path R2 defined in the upper central portion of housing 20 and directed to upper outlet port 27. The air branched to the first air flow path R1 is discharged from lower outlet port 29 toward the ground while the air branched to the second air flow path R2 is discharged from upper outlet port 27 to duct 28 (see FIG. 8) so that the air is discharged downward from lower opening 28b of duct 28 toward the ground.

During this, since the air branched into the second air flow path R2 moves along the return path (the upper portion) of V-belt 45 moving from the rear to the front, the air can smoothly flow without being impeded by V-belt 45. In addition, since the air is urged toward the upper side of housing 20 by centrifugal force due to rotation of driven pulley 44 and movement of V-belt 45, the air can be reliably directed to the upper air output port 27. Accordingly, the air flowability within housing 20 is extremely improved, so that heat from engine 30 and heat generated between V-belt 45 and pulleys 41 and 45 can be discharged out together with the cooling air. Therefore no heat will be retained and build up in housing 20.

Since the cooling air flows through the broadened range from the outgoing path to the middle of the return path of V-belt 45, the intake air can be discharged after sufficient cooling of V-belt 45, driven pulley 44, etc. without suffering the problem in that air just taken in would be discharged to the external space without providing cooling, unlike an outlet port is formed on the side face of housing 20.

Further, in this embodiment, since upper outlet port 27 is covered by duct 28 opening downward, it is possible to prevent entrance of rainwater, dirt and dust etc. into the housing and hence alleviate the contamination inside housing 20.

The above embodiment was described referring to an example where the present invention is applied to the power unit of a scooter type motorcycle, but the present invention can also be applied to a power unit mounted to a vehicle other than scooter type motorcycles. Further, the configuration of the housing is not limited to that where inner and outer covers are combined, that is, the present invention is not limited to the above embodiment but can be applied to covers having other shapes and configurations than the above.

In accordance with the present invention described heretofore, the following effects can be attained.

In accordance with the first feature of the present invention, since an upper side outlet port is formed in the housing upper surface opposing the approximate middle portion of the V-belt's return path along which the V-belt moves from the rear to the front in a V-belt transmission cooling system for a vehicle power unit of an engine, it is possible to efficiently flow and discharge air while preventing the air flow from being impeded by the V-belt, thus achieving an improved cooling effect.

In accordance with the second feature of the present invention, in addition to the upper outlet port, a lower side outlet port that opens downward is formed near the end of the outgoing path of the V-belt. Therefore, when the current of air created by the cooling fan is flowed along the outgoing path of the V-belt and reaches the end of the outgoing path, part of the air is discharged from the lower side outlet port while the rest is conveyed along the return path of the V-belt and discharged from the upper outlet port. Accordingly, it is possible to secure an improved air flowability inside the housing, thus achieving an excellent cooling efficiency.

In accordance with the third and fourth features of the present invention, since an outlet air conduit duct for conducting the discharged air from the upper outlet port downward is provided, it is possible to prevent entrance of rainwater, dirt and dust etc. from the upper side outlet port into the housing, hence it is possible to reduce the contamination inside the housing.

What is claimed is:

1. A cooling system for a vehicle power unit incorporating:
    a V-belt transmission in which a drive pulley fixed on a crankshaft of an engine and a driven pulley fixed to a driven shaft linked with a wheel axle are arranged one behind the other and an endless V-belt is wound between the pulleys and the crankshaft, in a housing thereof, the V-belt having an outgoing path along which the V-belt moves from a front section of the housing to a rear section of the housing and a return path along which the V-belt moves from the rear section to the front section, the cooling system comprising:
    a cooling fan rotated by the rotational force from the crankshaft and disposed in the housing so as to cool an internal space of the housing by introducing air into the housing and discharging the introduced air through a first outlet port formed in the housing to a location outside of the housing; and
    a second outlet port formed in an upper surface of the housing opposing an approximate middle portion of the return path of the V-belt,
    wherein the current of air created by the cooling fi is flowed along the outgoing path of the V-belt and then the air reaching an end of the outgoing path of the V-belt is flowed along the return path of the V-belt so as to discharge the air through the second outlet port.

2. The cooling system for a vehicle power unit according to claim 1, wherein the first outlet port opens downward and is formed near the end of the outgoing path of the V-belt, wherein the current of air created by the cooling fan is flowed along the outgoing path of the V-belt and then a first volume of the air reaching the end of the outgoing path is discharged from the lower side outlet port while a second volume is further flowed along the return path of the V-belt and discharged from the second outlet port.

3. The cooling system for a vehicle power unit according to claim 1, wherein an outlet air conduit duct for conducting the discharged air from the second outlet port downward is joined to the second outlet port.

4. The cooling system for a vehicle power unit according to claim 1, wherein the first outlet port is formed in a lower surface of the housing in the rear section thereof.

5. The cooling system for a vehicle power unit according to claim 1, wherein the first outlet port is formed in a lower surface of the housing proximate the driven pulley and the second outlet port is formed between the driven pulley and the drive pulley.

6. The cooling system for a vehicle power unit according to claim 2, wherein an outlet air conduit duct for conductive the discharged air from the second outlet port downward is joined to the second outlet port.

7. A cooling system for a vehicle power unit incorporating:
 a V-belt transmission in which a drive pulley fixed on a crankshaft of an engine and a driven pulley fixed to a driven shaft linked with a wheel axle are arranged one behind the other and an endless V-belt is wound between the pulleys and the crankshaft, in a housing thereof, the V-belt having an outgoing path along which the V-belt moves from a front section of the housing to a rear section of the housing and a return path along which the V-belt moves from the rear section to the front section, the cooling system comprising:
 a cooling fan rotated by the rotational force from the crankshaft and disposed in the housing so as to cool an internal space of the housing by introducing air into the housing and discharging the introduced air through a first outlet port formed in the housing to a location outside of the housing; and
 a second outlet port formed in an upper surface of the housing opposing approximate middle portion of the return path of the V-belt,
 wherein the current of air created by the cooling fan is flowed along the outgoing path of the V-belt and then the air reaching an end of the outgoing path of the V-belt is flowed along the return path of the V-belt so as to discharge the air through the second outlet port, the driven pulley being disposed at the end of the outgoing path, wherein the first outlet port is disposed behind the driven pulley.

8. The cooling system for a vehicle power unit according to claim 7, wherein the first outlet port opens downward and is formed near the end of the outgoing path of the V-belt, wherein the current of air created by the cooling fan is flowed along the outgoing path of the V-belt and a first volume of the air reaching the end of the outgoing path is discharged from the first outlet port while a second volume is further flowed along the return path of the V-belt and discharged from the second outlet port.

9. The cooling system for a vehicle power unit according to claim 7, wherein an outlet air conduit duct for conducting the discharged air from the second outlet port downward is joined to the second outlet port.

10. The cooling system for a vehicle power unit according to claim 7, further including:
 a baffle plate disposed integrally with a case behind the driven pulley, the baffle plate defining a first air flow path and a second air flow path, the first air flow path being disposed behind the baffle plate and in communication with the first outlet port for directing air thereto, wherein the second air flow path causes air to branch upward behind the driven pulley from the first air flow path, the second air flow path being in communication with the second outlet port for delivering air thereto.

11. The cooling system for a vehicle power unit according to claim 8, wherein an outlet air conduit duct for conductive the discharged air from the second outlet port downward is joined to the second outlet port.

* * * * *